United States Patent
Kang et al.

(10) Patent No.: US 11,168,651 B2
(45) Date of Patent: Nov. 9, 2021

(54) EXHAUST GAS RECIRCULATION COOLER ASSEMBLY

(71) Applicants: Hyundai Motor Company, Seoul (KR); Kia Motors Corporation, Seoul (KR)

(72) Inventors: Seung Jae Kang, Seoul (KR); Hyun Jin Park, Incheon (KR); Won Rok Choi, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 26 days.

(21) Appl. No.: 16/447,482

(22) Filed: Jun. 20, 2019

(65) Prior Publication Data
US 2020/0173399 A1    Jun. 4, 2020

(30) Foreign Application Priority Data
Dec. 3, 2018  (KR) .................. 10-2018-0153762

(51) Int. Cl.
*F02M 26/30*   (2016.01)
*F02M 26/35*   (2016.01)
*F02M 26/00*   (2016.01)

(52) U.S. Cl.
CPC ............ *F02M 26/30* (2016.02); *F02M 26/35* (2016.02); *F02M 2026/004* (2016.02)

(58) Field of Classification Search
CPC .. F02M 26/30; F02M 26/35; F02M 2026/004; F02M 26/32; F02M 26/15; F02M 26/28; F02M 26/23; F02M 26/33; F02M 26/52; F01N 13/08; F01N 2240/36; F01N 2240/02; F01N 3/0205; F01N 2260/024; F01N 3/021; F01N 3/043; F02D 41/0077; Y02T 10/12

See application file for complete search history.

(56) References Cited

U.S. PATENT DOCUMENTS

| | | | | |
|---|---|---|---|---|
| 5,785,030 A | * | 7/1998 | Paas | ........................ F01N 3/04 60/278 |
| 8,291,699 B2 | * | 10/2012 | Gonzalez | .............. F01N 13/145 60/323 |
| 2017/0248050 A1 | * | 8/2017 | Ohrem | ...................... F01N 3/02 |

FOREIGN PATENT DOCUMENTS

| | | | | |
|---|---|---|---|---|
| CN | 204060978 U | * | 12/2014 | |
| DE | 102009058609 A1 | * | 6/2011 | ............. F02M 26/06 |
| EP | 2273095 A1 | * | 1/2011 | ............. F28F 19/01 |

* cited by examiner

*Primary Examiner* — David Hamaoui
(74) *Attorney, Agent, or Firm* — Slater Matsil, LLP

(57) ABSTRACT

An exhaust gas recirculation (EGR) cooler assembly can be used to perform heat exchange between cooling water and exhaust gas. The EGR cooler assembly includes an EGR cooler in which cooling water flows, and a diesel particulate filter (DPF) including a housing accommodating therein the EGR cooler and a filter unit for post-treatment of the exhaust gas. An inside of the housing is sectioned by a partition into a first space in which the EGR cooler is inserted and a second space in contact with the filter unit, and the partition has a flow hole formed thereon in order to allow the exhaust gas to flow to the EGR cooler.

17 Claims, 4 Drawing Sheets

[FIG. 1]
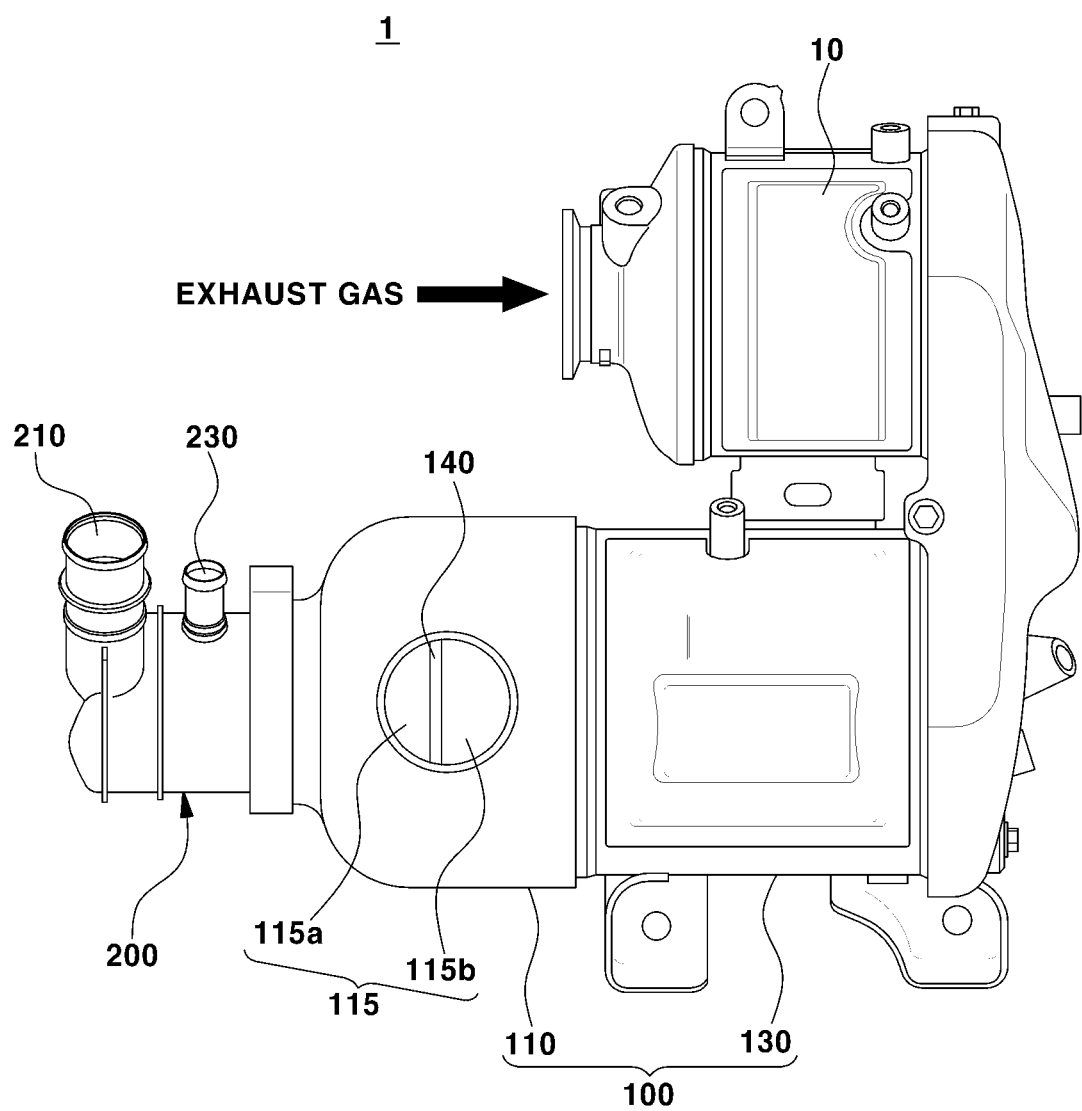

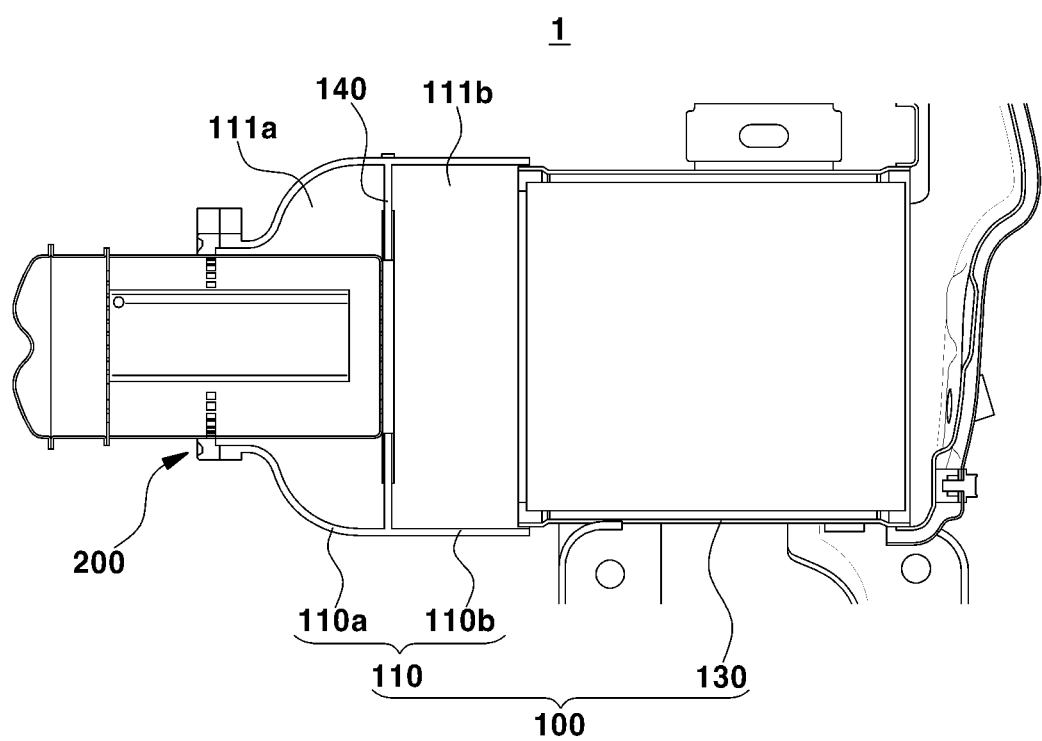
[FIG. 2]

[FIG. 3]
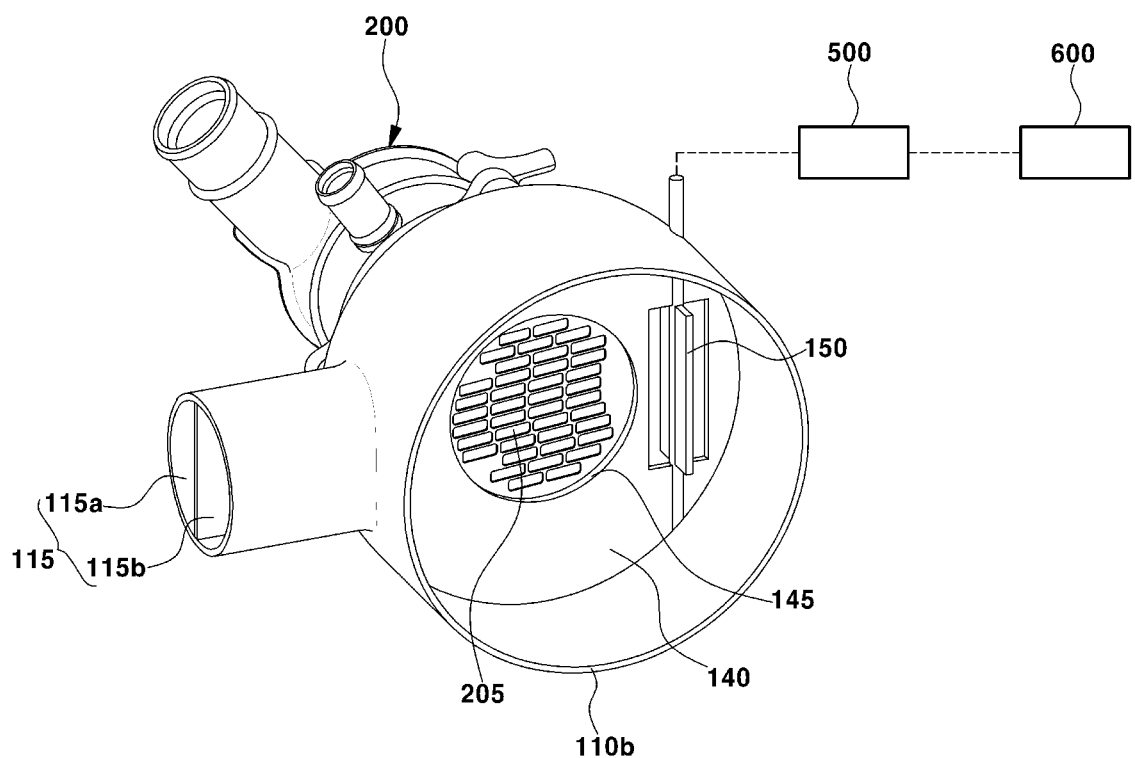

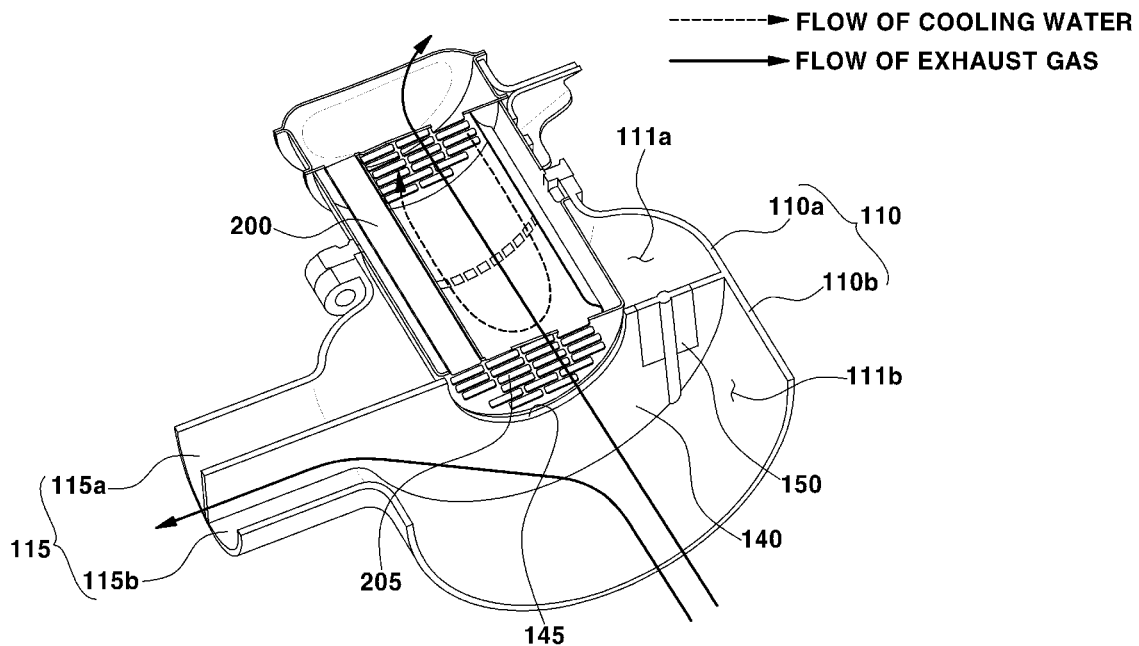
[FIG. 4]
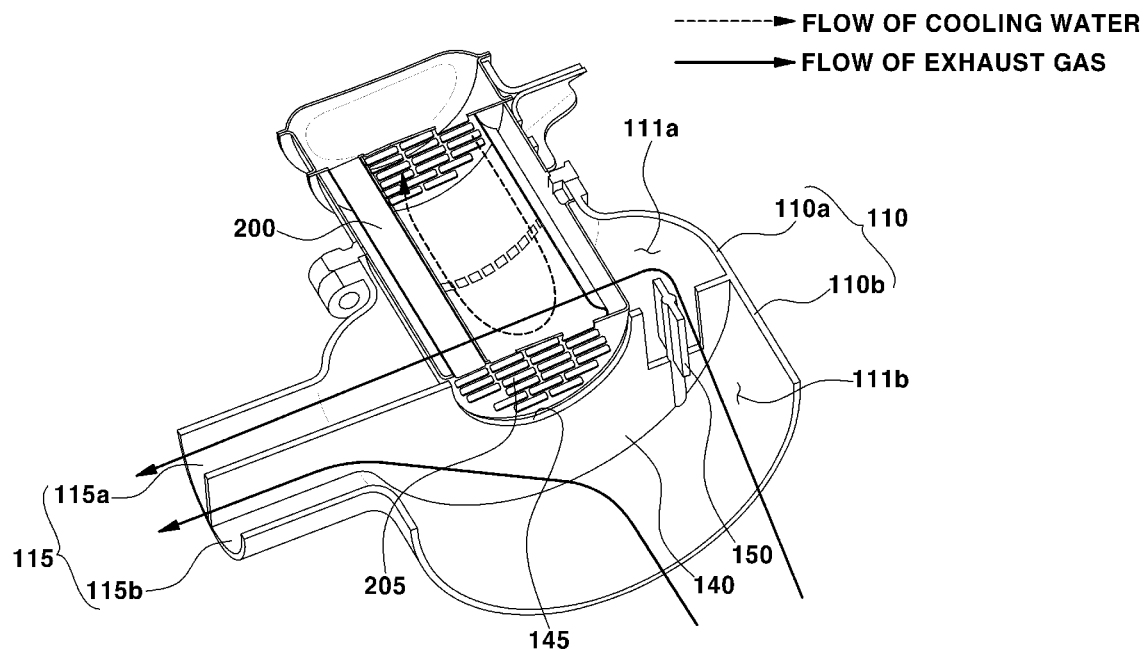
[FIG. 5]

EXHAUST GAS RECIRCULATION COOLER ASSEMBLY

CROSS-REFERENCE TO RELATED APPLICATIONS

This application claims priority to Korean Patent Application No. 10-2018-0153762, filed on Dec. 3, 2018, which application is hereby incorporated herein by reference.

TECHNICAL FIELD

The present invention generally relates to an exhaust gas recirculation (EGR) cooler assembly.

BACKGROUND

Generally, an EGR cooler applied to an engine recirculates a portion of exhaust gas back to an intake line to reduce a maximum temperature during combustion, thereby inhibiting production of nitrogen oxides (NOx). The EGR cooler can reduce a temperature of exhaust gas recirculated to the intake line, through cooling water.

Meanwhile, since a conventional EGR cooler is connected to a diesel particulate filter (DPF) which filters impurities included in exhaust gas, using a separate line, a process of connecting between the EGR cooler and the DPF is additionally needed. In addition, cooling water flowing in the EGR cooler may freeze at an extremely low outdoor temperature, which may be problematic. However, it is practically difficult to add a separate device for preventing freezing of the cooling water inside the EGR cooler.

The foregoing is intended merely to aid in the understanding of the background of the present invention, and is not intended to mean that the present invention falls within the purview of the related art that is already known to those skilled in the art.

SUMMARY

The present invention generally relates to an exhaust gas recirculation (EGR) cooler assembly and, in particular embodiments, to an EGR cooler assembly in which a diesel particulate filter (DPF) has a valve for controlling exhaust gas flowing into the EGR cooler.

Accordingly, embodiments of the present invention the problems occurring in the related art and propose an EGR cooler assembly, which can raise a temperature of cooling water at a low temperature while performing an original function of cooling exhaust gas.

In addition, embodiments of the invention propose an EGR cooler assembly without a separate line for connecting between the EGR cooler and the DPF.

According to one aspect of the present invention, an EGR cooler assembly, in which heat exchange is performed between cooling water and exhaust gas, includes an EGR cooler in which the cooling water flows. A DPF includes a housing accommodating therein the EGR cooler and a filter unit for post-treatment of the exhaust gas. An inside of the housing is sectioned by a partition into a first space in which the EGR cooler is inserted and a second space in contact with the filter unit. The partition has a flow hole formed thereon in order to allow the exhaust gas to flow to the EGR cooler.

In an embodiment, the partition may be provided with a valve for controlling flow of the exhaust gas.

In an embodiment when the valve is opened, the exhaust gas introduced from the DPF may contact with an outer surface of the EGR cooler inserted in the first space.

In an embodiment, when the valve is closed, the exhaust gas introduced from the DPF may flow into the EGR cooler and thus may be lowered in temperature by the cooling water.

In an embodiment, the EGR cooler assembly may further include a sensor for measuring a temperature of the cooling water and a controller for controlling the valve. The controller opens the valve when the temperature of the cooling water measured by the sensor is lower than a preset temperature.

In an embodiment, when the temperature of the cooling water is higher than the preset temperature, the controller may close the valve to control the exhaust gas, so that the exhaust gas flows into the EGR cooler and is cooled.

In an embodiment, the housing may have an outlet defined thereon for discharging the exhaust gas to an outside of a vehicle, the outlet may be sectioned by the partition into a first outlet and a second outlet, and the first outlet is an area for opening the first space and the second outlet is an area for opening the second space.

In an embodiment, the partition may have a valve for controlling flow of the exhaust gas, wherein when the valve is closed, the exhaust gas flows to the second outlet, and when the valve is opened, the exhaust gas flows to the first outlet and the second outlet.

In an embodiment, the housing may be sectioned into a first housing defining the first space and a second housing defining the second space, and the first housing may be disposed to cover an end part of the EGR cooler.

According to the embodiment of the present invention, by using exhaust gas flowing into the housing, the temperature of the cooling water being lower than the preset temperature can be raised at a low temperature condition.

According to the embodiment of the present invention, by using a structure in which the EGR cooler is inserted into the housing of the DPF, the separate line typically used to connect the EGR cooler and the DPF together can be omitted. Accordingly, it is possible to simplify a process of implementing the EGR cooler assembly and to reduce cost of manufacturing the EGR cooler assembly.

According to the embodiment of the present invention, by providing the valve inside the housing connecting the DPF and the EGR cooler together, the EGR cooler assembly can be implemented to function as a general EGR cooler assembly for cooling exhaust gas and as a cooling water boiler for raising a temperature of cooling water inside the EGR cooler.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a view showing a structure of an EGR cooler assembly according to an embodiment of the present invention.

FIG. 2 is a sectional view showing the EGR cooler assembly according to the embodiment of the present invention.

FIG. 3 is a perspective view showing a housing of a DPF according to the embodiment of the present invention.

FIG. 4 is a sectional perspective view showing a case in which a valve provided on the housing according to the embodiment of the present invention is closed.

FIG. 5 is a sectional perspective view showing a case in which the valve provided on the housing according to the embodiment of the present invention is opened.

DETAILED DESCRIPTION OF ILLUSTRATIVE EMBODIMENTS

Hereinbelow, features and advantages of the present invention will be more clearly understood in reference with the following detailed-described embodiment with the accompanying drawings. However, the present invention should be understood that the present invention may be variously embodied, without being limited to the exemplary embodiment, the embodiment of the present invention described below is provided for allowing those skilled in the art to more clearly comprehend the present invention, and the present invention is defined only by the scope of the claims. Throughout the description, the same reference numerals will refer to the same or like parts.

Hereinbelow, in the description, the terms "~part", "unit", "module", "apparatus" and the like mean a unit for processing at least one function or operation and may be implemented by a combination of hardware and/or software.

In addition, terms such as "a first ~" and "a second ~" are used only for the purpose for distinguishing a constitutive element from other constitutive element, but constitutive element should not be limited to a manufacturing order.

The detailed description is illustrative of the present invention. In addition, the following is a description of a preferred embodiment of the present invention, and the present invention can be used in various combinations, modifications, and environments. That is, the following can be modified and altered within the scope of the concept of the present invention as disclosed herein, the scope of equivalents to the described disclosure, and/or the scope of skill or knowledge of the art. The described embodiment illustrates the best mode for implementing the technical idea of the present invention, and can be variously modified as required in the specific application area and use of the present invention. Thus, the detailed description of the present invention is not limited to the embodiment which will be disclosed hereinbelow. The accompanying claims are intended to cover not only the exemplary embodiment, but also various alternatives, modifications, equivalents and other embodiments.

FIG. 1 is a view showing a structure of an EGR cooler assembly according to an embodiment of the present invention, and FIG. 2 is a sectional view showing the EGR cooler assembly according to the embodiment of the present invention.

Referring to FIGS. 1 and 2, the EGR cooler assembly 1 may include a Catalyst unit 10 in which exhaust gas flows, a DPF 100 for post-treating exhaust gas, and an EGR cooler 200. Exhaust gas discharged from a turbo charger (not shown) can pass through the Catalyst unit 10. The Catalyst unit 10 may be one of a lean NOx trap (LNT) or a diesel oxidation catalyst (DOC). The Catalyst unit 10 can remove NOx included in exhaust gas by oxidation-reduction reaction or can oxidize hydrocarbon and carbon monoxide included in exhaust gas by catalysis. Exhaust gas passing through the Catalyst unit 10 may flow into the DPF 100.

The DPF 100 may include a housing 110 in contact with a first end of the EGR cooler 200 and a filter unit 130 for post-treating the exhaust gas. The housing 110 and the filter unit 130 may be connected to each other.

The housing 110 may include a first housing 110a accommodating therein the EGR cooler 200 and a second housing 110b in contact with the filter unit 130. The first housing 110a and the second housing 110b may be connected to each other, and be sectioned by a partition 140 into respective spaces. The first housing 110a may be provided to cover a first end of the EGR cooler 200. The first housing 110a may have an inside space as a first space 111a, and the second housing 110b may have an inside space as a second space 111b. As the EGR cooler 200 may be inserted into the first space 111a, a separate line for connecting between the EGR cooler 200 and the DPF 100 may not be needed. Exhaust gas may contact with an outer surface of the EGR cooler 200, through the first space 111a.

The housing 110 may have an outlet 115 for discharging exhaust gas to outside of a vehicle. The outlet 115 may be sectioned by the partition 140 into a first outlet 115a and a second outlet 115b. The first outlet 115a may be an area for opening the first space 111a, and the second outlet 115b may be an area for opening the second space 111b. That is, the first outlet 115a may discharge exhaust gas flowing inside the first space 111a, and the second outlet 115b may discharge exhaust gas flowing inside the second space 111b.

The filter unit 130 may filter exhaust gas discharged from the turbo charger (not shown). The filter unit 130 may filter particulates included in the exhaust gas. Particularly, the filter unit 130 may collect diesel particulates which are discharged from the turbo charger (not shown) in an unburned state, using a trap, and raise an inside temperature higher than an ignition temperature to repeatedly remove the particulates. The exhaust gas filtered by the filter unit 130 may be introduced to the housing 110 and flow into the EGR cooler 200.

The EGR cooler 200 may recirculate and cool the exhaust gas flowing therein. The EGR cooler 200 may circulate a portion of the incoming exhaust gas to the turbo charger (not shown). In addition, the EGR cooler 200 may have a cooling water inlet 210 for introducing cooling water into the EGR cooler 200 and a cooling water outlet 230 for discharging the cooling water which is introduced into the EGR cooler 200 and rises in temperature through heat-exchange with the exhaust gas. The cooling water inlet 210 and the cooling water outlet 230 may be provided on a second end of the EGR cooler 200 which is opposed to the first end of the EGR cooler 200 in which exhaust gas having high temperature directly flows. The first end of the EGR cooler 200 may contact the first housing 110a and the partition 140.

According to an embodiment of the present invention, in the low temperature condition, a temperature of the cooling water lower than a preset temperature may be raised by the exhaust gas flowing into the housing 110. Here, the housing 110 may be provided to cover the first end of the EGR cooler 200.

In addition, according to an embodiment of the present invention, the EGR cooler 200 may be inserted into the housing 110 of the DPF 100 without the separate line connecting between the EGR cooler 200 and the DPF 100. Accordingly, it is possible to simplify a process of implementing the EGR cooler assembly 1 and to reduce cost of manufacturing the EGR cooler assembly 1.

FIG. 3 is a perspective view showing the housing of the DPF according to the embodiment of the present invention.

Referring to FIGS. 1 to 3, the DPF 100 may have the partition 140 sectioning the housing 110 into the first housing 110a and the second housing 110b, and the partition 140 may have a valve 150 and a flow hole 145 penetrated through the partition for allowing exhaust gas to flow to the EGR cooler 200. By the flow hole 145, cooling fins 205 of the EGR cooler 200 are exposed. That is, the exhaust gas passing through the flow hole 145 may flow into the EGR cooler 200.

The valve 150 may be electrically connected to a controller 500, and the controller 500 may be electrically connected to a sensor 600. The sensor 600 may measure a temperature of cooling water inside the EGR cooler 200 and an outdoor temperature. The controller 500 may control the valve 150, based on information of the temperature of the cooling water and the outdoor temperature measured by the sensor 600. For example, when the temperature of the cooling water measured by the sensor 600 is lower than the preset temperature, the controller 500 may open the valve 150. In addition, when the temperature of the cooling water is higher than the preset temperature, the controller 500 may close the valve 150, and with closing the valve 150, the exhaust gas may flow into the EGR cooler 200 only. Meanwhile, unlike the above-mentioned example, the controller 500 may control degree of opening the valve 150, and the degree of opening the valve 150 is controlled based on the information measured by the sensor 600.

In addition, the controller 500 may preset a reference temperature of the cooling water based on an outdoor temperature measured by the sensor 600. For example, at a sub-zero outdoor temperature, the controller 500 may set the reference temperature of the cooling water higher than when the outdoor temperature is at an above-zero temperature. In addition, at the above-zero outdoor temperature, the controller 500 may set the reference temperature of the cooling water lower than when the outdoor temperature is at the sub-zero temperature. Here, the preset temperature of the cooling water may be the information used to control the degree of opening the valve 150.

According to the embodiment of the present invention, a flow passage of exhaust gas may be adjusted in accordance with opening and closing the valve 150. In addition, the housing 110 may function to raise a temperature of the cooling water flowing into the EGR cooler 200 and allow exhaust gas to flow to the EGR cooler 200 in accordance with the opening and closing the valve 150.

FIG. 4 is a sectional perspective view showing a case in which the valve provided on the housing according to the embodiment of the present invention is closed.

Referring to FIGS. 3 and 4, when the temperature of the cooling water flowing inside the EGR cooler 200 is higher than the preset temperature, the valve 150 may be closed. When the valve 150 is closed, exhaust gas may flow inside the second housing 110b. A portion of the exhaust gas flowing inside the second housing 110b may be discharged through the second outlet 115b to the outside of the vehicle, and another portion of the exhaust gas may flow through the cooling fins 205 and the flow hole 145 into the EGR cooler 200. That is, when the valve 150 is closed, the housing 110 and the EGR cooler 200 may function as a general EGR cooler assembly for cooling exhaust gas through heat-exchange with cooling water.

FIG. 5 is a sectional perspective view showing a case in which the valve provided on the housing according to the embodiment of the present invention is opened.

Referring to FIGS. 3 and 5, when the temperature of the cooling water flowing inside the EGR cooler 200 is lower than the preset temperature, the valve 150 may be opened. When the valve 150 is opened, a portion of the exhaust gas may flow inside the second housing 110b, and another portion of the exhaust gas may flow into the first housing 110a. The exhaust gas flowing into the first housing 110a may raise a temperature inside the first space 111a, and contact with the outer surface of the EGR cooler 200 to raise the temperature of the cooling water flowing inside the EGR cooler 200. The exhaust gas flowing in the first space 111a may be discharged through the first outlet 115a to the outside of the vehicle. A portion of the exhaust gas flowing inside the second space 111b may be discharged through the second outlet 115b to the outside of the vehicle, and another portion of the exhaust gas flowing inside the second space 111b may flow through the flow hole 145 and the cooling fins 205 into the EGR cooler 200. That is, when the valve 150 is opened, the housing 110 and the EGR cooler 200 may function as both the general EGR cooler assembly for cooling exhaust gas through heat-exchange with cooling water and a cooling water boiler for raising a temperature of cooling water inside the EGR cooler 200.

Although the embodiment of the present invention has been described with reference to the accompanying drawings, those skilled in the art will appreciate that various modifications, additions and substitutions are possible, without departing from the scope and spirit of the invention as disclosed in the accompanying claims. Therefore, it should be understood that all above-described embodiments are illustrative and not restrictive in all aspects.

What is claimed is:

1. An exhaust gas recirculation (EGR) cooler assembly in which heat exchange is performed between cooling fluid and exhaust gas, the EGR cooler assembly comprising:
   an EGR cooler in which cooling fluid can flow; and
   a diesel particulate filter (DPF) including a housing accommodating the EGR cooler and a filter unit for post-treatment of the exhaust gas;
   wherein an inside of the housing is sectioned by a partition into a first space in which the EGR cooler is inserted and a second space in contact with the filter unit;
   wherein the partition has a flow hole formed thereon in order to allow the exhaust gas to flow to the EGR cooler;
   wherein the housing is sectioned into a first housing defining the first space and a second housing defining the second space, the first housing being disposed to cover a first end of the EGR cooler;
   wherein the housing has an outlet defined thereon for discharging the exhaust gas to outside of a vehicle;
   wherein the outlet is sectioned by the partition into a first outlet and a second outlet; and
   wherein the first outlet is an area for opening the first space and the second outlet is an area for opening the second space.

2. The EGR cooler assembly of claim 1, wherein the partition is provided with a valve for controlling flow of the exhaust gas.

3. The EGR cooler assembly of claim 2, wherein the EGR cooler assembly is configured so that when the valve is opened the exhaust gas introduced from the DPF contacts an outer surface of the EGR cooler inserted in the first space.

4. The EGR cooler assembly of claim 2, wherein the EGR cooler assembly is configured so that when the valve is closed the exhaust gas introduced from the DPF flows into the EGR cooler and is lowered in temperature by the cooling fluid.

5. The EGR cooler assembly of claim 2, further comprising a sensor configured to measure a temperature of the cooling fluid and a controller configured to control the valve, wherein the controller is configured to open the valve when the temperature of the cooling fluid measured by the sensor is lower than a preset temperature.

6. The EGR cooler assembly of claim 5, wherein, when the temperature of the cooling fluid is higher than the preset temperature, the controller is configured to close the valve to control the exhaust gas, so that the exhaust gas flows into the EGR cooler and is cooled.

7. The EGR cooler assembly of claim 1, wherein the partition has a valve for controlling flow of the exhaust gas, and when the valve is closed, the exhaust gas can flow to the second outlet, and when the valve is opened, the exhaust gas can flow to the first outlet and the second outlet.

8. A vehicle comprising:
an engine;
an EGR cooler in which cooling fluid can flow; and
a diesel particulate filter (DPF) including a housing accommodating the EGR cooler and a filter unit for post-treatment of exhaust gas,
wherein an inside of the housing is sectioned by a partition into a first space in which the EGR cooler is inserted and a second space in contact with the filter unit;
wherein the partition has a flow hole formed thereon in order to allow the exhaust gas to flow to the EGR cooler;
wherein the housing is sectioned into a first housing defining the first space and a second housing defining the second space, and the first housing is disposed to cover a first end of the EGR cooler assembly; and
wherein the housing has an outlet defined thereon for discharging the exhaust gas to outside of the vehicle, the outlet is sectioned by the partition into a first outlet and a second outlet, and the first outlet is an area for opening the first space and the second outlet is an area for opening the second space.

9. The vehicle of claim 8, wherein the partition is provided with a valve for controlling flow of the exhaust gas.

10. The vehicle of claim 9, wherein the EGR cooler and the DPF are configured so that when the valve is opened the exhaust gas introduced from the DPF contacts an outer surface of the EGR cooler inserted in the first space.

11. The vehicle of claim 9, wherein the EGR cooler and the DPF are configured so that when the valve is closed the exhaust gas introduced from the DPF flows into the EGR cooler and is lowered in temperature by the cooling fluid.

12. The vehicle of claim 9, further comprising a sensor configured to measure a temperature of the cooling fluid and a controller configured to control the valve, wherein the controller is configured to open the valve when the temperature of the cooling fluid measured by the sensor is lower than a preset temperature.

13. The vehicle of claim 12, wherein, when the temperature of the cooling fluid is higher than the preset temperature, the controller is configured to close the valve to control the exhaust gas, so that the exhaust gas flows into the EGR cooler and is cooled.

14. The vehicle of claim 8, wherein the partition has a valve for controlling flow of the exhaust gas, and when the valve is closed, the exhaust gas can flow to the second outlet, and when the valve is opened, the exhaust gas can flow to the first outlet and the second outlet.

15. An exhaust gas recirculation (EGR) cooler assembly in which heat exchange is performed between cooling fluid and exhaust gas, the EGR cooler assembly comprising:
an EGR cooler in which cooling fluid can flow; and
a diesel particulate filter (DPF) including a housing accommodating the EGR cooler and a filter unit for post-treatment of the exhaust gas;
wherein an inside of the housing is sectioned by a partition into a first space in which an end part of the EGR cooler is inserted and a second space in contact with the filter unit such that the end part of the EGR cooler is covered by the housing and exhaust gas in the first space contacts with an outer surface of the end part of the EGR cooler;
wherein the partition has a flow hole formed thereon in order to allow the exhaust gas to flow to the EGR cooler;
wherein the housing has an outlet defined thereon for discharging the exhaust gas to outside of a vehicle;
wherein the outlet is sectioned by the partition into a first outlet and a second outlet; and
wherein the first outlet is an area for opening the first space and the second outlet is an area for opening the second space.

16. The EGR cooler assembly of claim 15, wherein the partition is provided with a valve for controlling flow of the exhaust gas.

17. The EGR cooler assembly of claim 16, wherein the EGR cooler assembly is configured so that when the valve is opened the exhaust gas introduced from the DPF contacts an outer surface of the EGR cooler inserted in the first space and so that the valve is closed the exhaust gas introduced from the DPF flows into the EGR cooler and is lowered in temperature by the cooling fluid.

* * * * *

UNITED STATES PATENT AND TRADEMARK OFFICE
CERTIFICATE OF CORRECTION

PATENT NO. : 11,168,651 B2  
APPLICATION NO. : 16/447482  
DATED : November 9, 2021  
INVENTOR(S) : Seung Jae Kang Page 1 of 1

It is certified that error appears in the above-identified patent and that said Letters Patent is hereby corrected as shown below:

In the Claims

Claim 8, Column 7, Line 30; delete "EGR cooler assembly; and" and insert --EGR cooler; and--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*